United States Patent [19]

Ohtsuka et al.

[11] Patent Number: 4,682,876
[45] Date of Patent: Jul. 28, 1987

[54] INFORMATION RECORDING APPARATUS

[75] Inventors: Yasumasa Ohtsuka; Masaharu Ohkubo, both of Yokohama, Japan

[73] Assignee: Canon Kabushiki Kaisha, Tokyo, Japan

[21] Appl. No.: 831,182

[22] Filed: Feb. 20, 1986

[30] Foreign Application Priority Data

Feb. 20, 1985 [JP] Japan ................... 60-031796

[51] Int. Cl.$^4$ ............................. G03G 15/00
[52] U.S. Cl. ........................ 355/3 R; 355/1; 355/14 R; 346/76 L; 430/945
[58] Field of Search ............. 355/3 R, 14 R, 1, 3 CH, 355/14 E, 14 CH; 346/76 L, 108; 430/945

[56] References Cited

U.S. PATENT DOCUMENTS

| | | | |
|---|---|---|---|
| 4,469,430 | 9/1984 | Terashima | 355/3 R |
| 4,538,895 | 9/1985 | Higgins et al. | 355/3 R |
| 4,545,669 | 10/1985 | Hays et al. | 355/3 R |
| 4,589,732 | 5/1986 | Shiraishi et al. | 355/3 R X |
| 4,589,764 | 5/1986 | Tadokoro et al. | 355/14 R |

Primary Examiner—A. C. Prescott
Attorney, Agent, or Firm—Fitzpatrick, Cella, Harper & Scinto

[57] ABSTRACT

An information recording apparatus, includes a semiconductor light source responsive to an information signal to be recorded to produce information light; a photosensitive member for receiving the information light produced by said semiconductor light source; a driver for supplying to said semiconductor light source an electric current $I_0$ having a current level lower than a light emitting threshold current Ith of said semiconductor light source before said semiconductor light source is driven in accordance with the information signal to be recorded, so that said semiconductor light source heats itself by the application of the current $I_0$. Thus when the apparatus is in a stand-by state, the semicondcutor light source is supplied with an electric current which has a lower level than the threshold level, so that the semiconductor light source is self-heated due to the low level current.

5 Claims, 8 Drawing Figures

INFORMATION RECORDING APPARATUS

FIELD OF THE INVENTION AND RELATED ART

The present invention relates to an information recording apparatus for recording an information with the use of light modulated in accordance with a signal representing the information to be recorded.

In some types of information recording apparatus, a semiconductor light source such as a semiconductor laser and a light emitting diode (LED) is used as a light source for emitting the light carrying the information to be recorded.

For example, there is a laser beam printer as an information recording apparatus of an electrophotographic type, wherein a semiconductor laser is widely used recently as the light source for the information light or beam.

A semiconductor laser has a property that the emitting output changes in accordance with the temperature of the laser even if the driving current is constant, as shown in FIG. 1. In order to stabilize the output of the semiconductor laser, it has been proposed in Japanese Laid-Open Utility Model Application No. 46264/1976 that the temperature of the semiconductor laser device is controlled. However, even if the temperature control means is always operated, the semiconductor laser device itself has a thermal capacity so that the temperature thereof does not very quickly respond to the temperature control means. For this reason, when the semiconductor laser is supplied with the driving current suddenly to emit the laser beam, the temperature of the laser temporarily increases by the self-heating beyond the set temperature of the temperature control means (overshooting), and during this period, the emitting output is below the predetermined. As a result, the amount of exposure of a photosensitive member is not sufficient within a certain period immediately after start of the laser emitting of the semiconductor laser. This is explained in the graph of FIG. 2. At the start, the temperature of the semiconductor laser is low so that the emitting output is high. The semiconductor laser by itself produces heat, and therefore, the temperature thereof is increased with the result that the power of the laser beam decreases in a certain period. If the laser beam printer having this property is used to form a solid black image, the resultant image contains stripes A, as shown in FIG. 3. When the imagewisely modulated light is produced by an array of light emitting diodes, a similar problem arises.

SUMMARY OF THE INVENTION

Accordingly, it is a principal object of the present invention to provide an improved information recording apparatus.

It is another object of the present invention to provide an information recording apparatus wherein the overshooting of the temperature of the laser is prevented at a period of time immediately after the start of emitting the semi-conductor laser beam.

It is a further object of the present invention to provide an information recording apparatus wherein non-uniform image formation is prevented during a certain period of time immediately after the start of emitting the semiconductor laser beam.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 4:
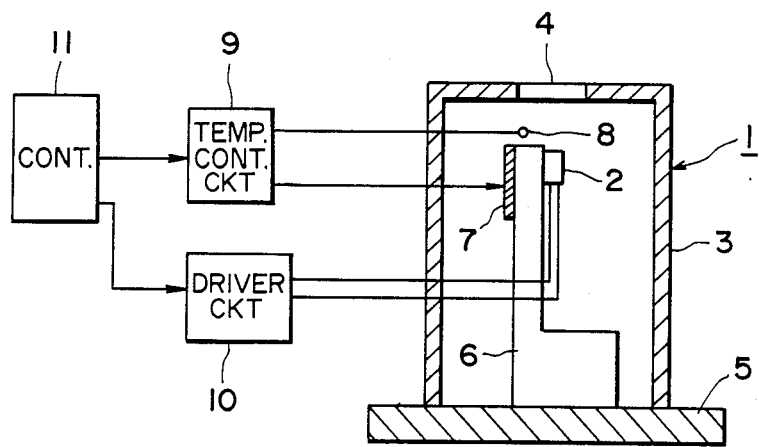
FIG. 4 is a somewhat schematic sectional view of a part of the information recording apparatus according to an embodiment of the present invention.

Referring to FIG. 4, there is shown a laser unit 1 usable with an information recording apparatus according to an embodiment of the present invention. The laser unit 1 comprises a semiconductor laser chip 2 which is fixed on a supporting member 6. The supporting member 6 is of an electrically insulating material, but it is preferable that the supporting member 6 has a good heat conductivity. The supporting member 6 is securedly fixed on a base plate 5. To the supporting member 6, a heater 7 is mounted, which functions to externally heat the laser chip 2 and the supporting member 6. In the neighborhood of the laser chip 2, there is a temperature detecting element 8, which serves to detect the temperature in the neighborhood of the laser chip 2. The temperature information detected by the temperature detecting element 8 is transmitted to a temperature control circuit 9. The control circuit 9 compares the temperature Ts detected by the temperature detecting element 8 and a predetermined temperature Tr under which the semiconductor laser 2 produces the laser of a predetermined intensity by a predetermined driving current $I_1$; and it on-off controls the voltage application to the heater from a power source not shown. By the control circuit 9, the temperature of the semiconductor laser 2 is controlled so that its temperature is within a predetermined temperature range containing the predetermined temperature Tr therein, the semiconductor laser producing the beam having proper intensity when the temperature of the semiconductor laser is within this temperature range.

The temperature control circuit 9, after a known main switch (not shown) for connecting the information recording apparatus to the power source is closed, is kept operated so as to maintain the temperature of the semiconductor laser 2 within the predetermined temperture range, during an information recording operation (the semiconductor laser 2 is driven in response to the signal of information to be recorded) and during a stand-by period (waiting period) (before the start of the information recording operation).

As shown in FIG. 4, a cap is fixed on the base plate 5 and serves to enclose the laser 2, the supporting member 6, the heater 7 and the temperature sensor 8. The cap 3 is provided with a transparent window made of glass or the like so as to allow the laser beam produced by the semiconductor laser 2 to pass through the window 4 to the outside.

To the semiconductor laser 2, a driving current is applied from the driving circuit 10, which is controlled by a controller 11 for controlling the entire image recording apparatus.

Figure 5:
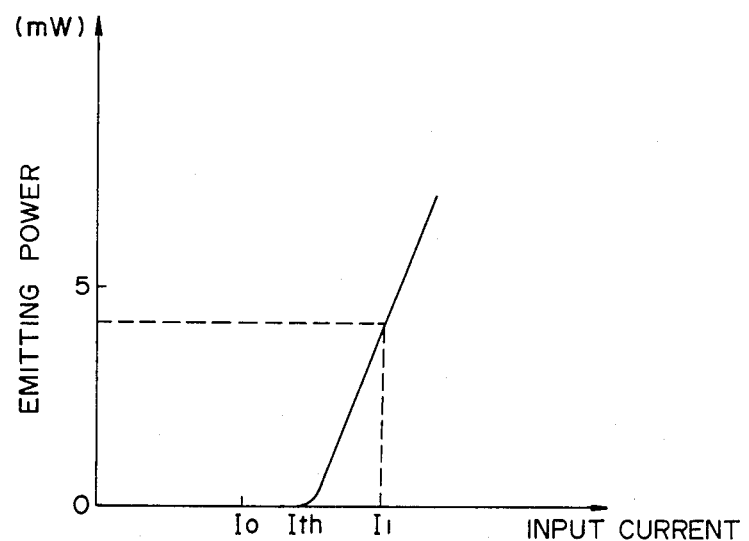
FIG. 5 is a graph showing the relationship between the input current and the emitting output of a semi-conductor laser.

FIG. 5 shows a relationship between the current applied to the semiconductor laser 2 and the intensity of the output beam from the semiconductor laser. As will be understood from this Figure, the semiconductor laser starts emitting the laser beam upon the input current becoming Ith, which is a threshold current. Therefore, when a current lower than this threshold current Ith is applied to the semiconductor laser, the laser does not emit the light but heats itself. When, on the other hand, a current higher than this threshold level Ith, the semiconductor laser 2 emits light.

Referring back to FIG. 4, the driving circuit 10 applies to the semiconductor laser 2 a current $I_0$ lower than the threshold level Ith when the image recording apparatus is in the stand-by state. The driving circuit 10 intermittently (imagewisely) applies to the semiconductor laser the current $I_1$ which is higher than the threshold level Ith in accordance with the information signal to be recorded, when the information recording operation is performed. Therefore, driving circuit 10 applies the current $I_1$ to the semiconductor laser 2 at such a point of time as to correspond to a picture element of the image information to be recorded. However, during the image information recording operation, it is not necessary to apply any electric current to the semiconductor laser 2 at such a point of time as to correspond to the background of the image to be recorded. Nevertheless, it is preferable that the semiconductor laser 2 is supplied with a current $I_0'$ which is lower than the threshold current Ith at such a point as to correspond to the background during the information recording operation, since then the deterioration of the semiconductor laser 2 is reduced which may be caused by a rash current. By this, the possible overshooting of the semiconductor laser 2 can be prevented which may be caused when the current $I_1$ is applied to the semiconductor laser 2 after a relatively long image background signal. The current $I_0'$ may be different from the above-described current $I_0$, but it is preferable that they are the same from the standpoint of simplifying the structure of the driving circuit 10. The foregoing descriptions apply to the case where LED elements are used as the light source.

Figure 6:
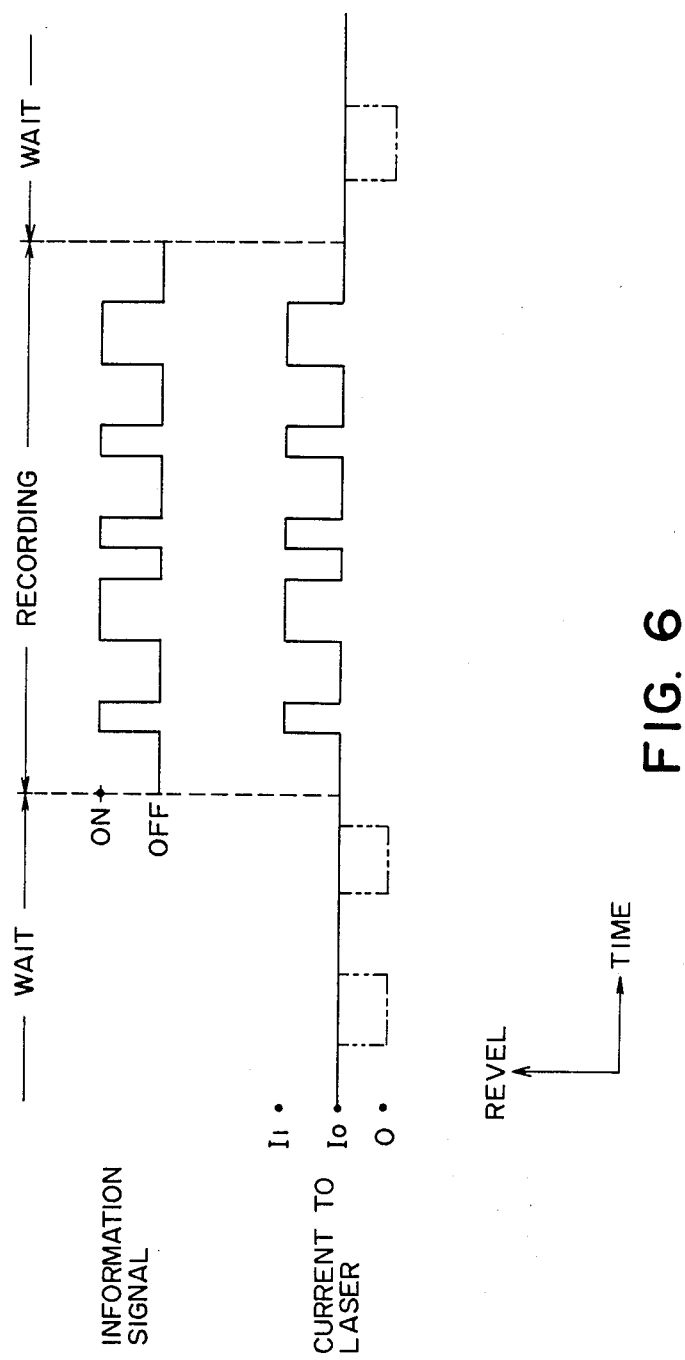
FIG. 6 is a time chart illustrating the operation of the apparatus according to the embodiment of the present invention

FIG. 6 is a time chart of the operation. During the stand-by state of the apparatus, the semiconductor laser 2 is supplied with the current $I_0$ so as to produce heat. During the information recording operation, the driving circuit 10 receives the information signal from the controller. When the information signal is at "ON" level, the driving circuit 10 applies the current $I_1$ to the semiconductor laser 2 so that the semiconductor laser 2 produces light. When the information signal is at "OFF" level, the driving circuit 10 applies the current $I_0$ to the semiconductor laser 2 so that it produces heat. At this time, however, the semiconductor laser 2 does not produce light. As shown by chain lines in FIG. 6, the semiconductor laser 2 may be intermittently supplied with the current $I_0$ even during the apparatus being in the stand-by state. In other words, when the apparatus is in the stand-by state, the current to the semi-conductor laser 2 may be intermittently shut. The control of doing this can be carried out using a known timer.

In any case, according to the embodiment described above, the semiconductor laser beam is heated not only by the heater 7 but also by the self-heat of the laser chip due to the current $I_0$, so that the temperature of the laser chip 2 is kept stabilized even at the time when the apparatus is switched from the stand-by state to the operating state, as compared with the case where the temperature is controlled only by the heater 7.

Figure 1:
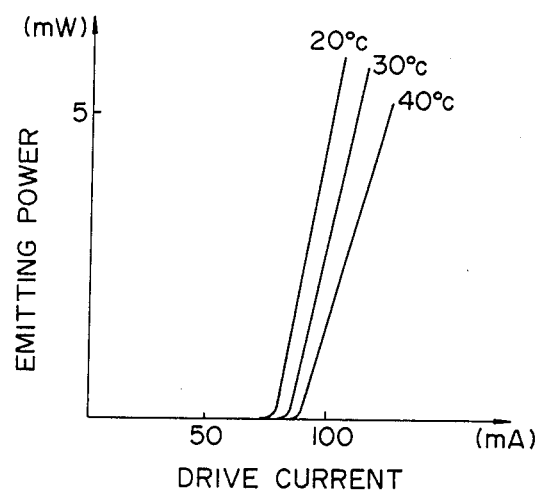
FIG. 1 is a graph showing the relationship between the temperature of the laser and the output thereof.
Figure 2:
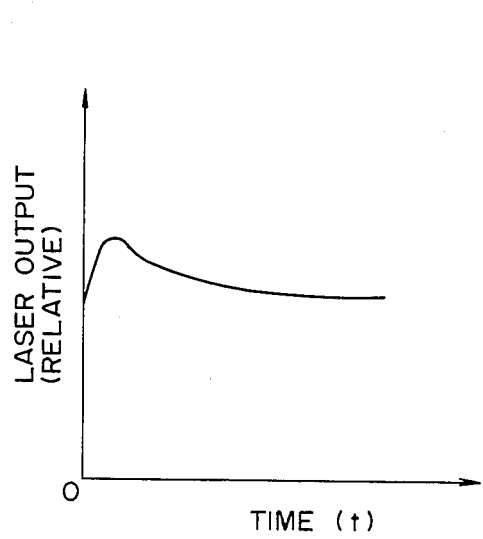
FIG. 2 is a graph showing a change of the semiconductor output with time in a conventional device.
Figure 3:
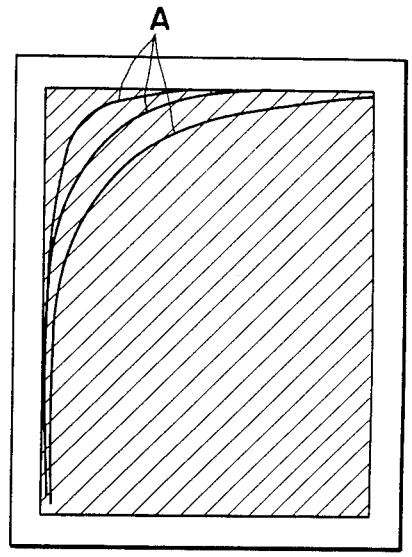
FIG. 3 is an example of a solid black image provided by a conventional apparatus, wherein the image density which should be uniform has stripes.
Figure 7:
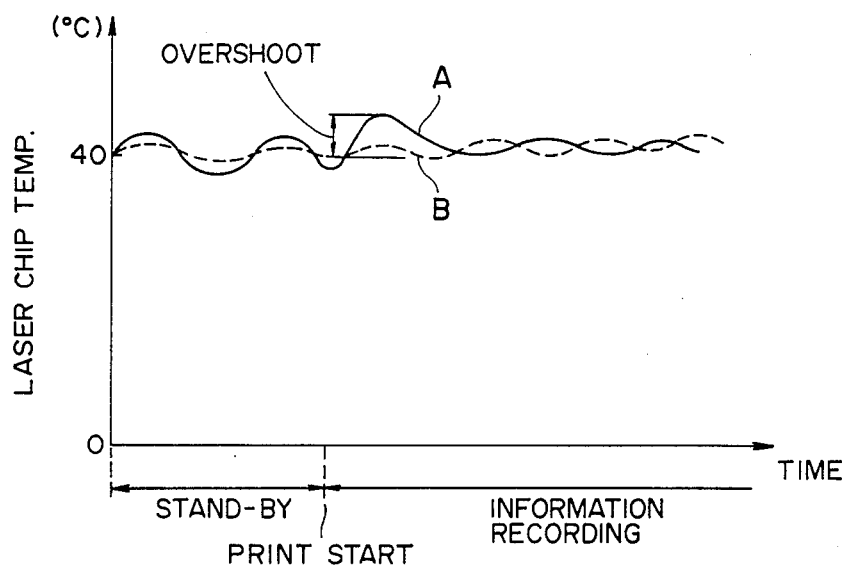
FIG. 7 is a graph showing the relation between the time and the temperature of a semiconductor laser.

FIG. 7 illustrates the relationship of the laser chip temperature with time, wherein "A" indicates the relationship in a conventional apparatus, and "B" indicates that of the apparatus according to the embodiment of the present invention. In the curve A, the laser chip is temperature-controlled by an external heater, that is, the heater 7, whereas in the curve B, the laser chip 2 is temperature-controlled both by the heater 7 and the self-heating by the current $I_0$. As will be understood, the ripple is improved during the stand-by period, and in addition, the overshooting of the temperature immediately after the start of the information recording operation is reduced. Because of this, the occurrence of stripes on the recorded image, as shown in FIG. 3, can be eliminated. In the example shown in FIG. 7, the target temperature to which the semiconductor laser 2 is controlled is 40° C., which however, may be different and may be determined in response to the properties of the semiconductor laser and the photosensitive member to be used and/or the ambient temperature at which the apparatus is operated.

Figure 8:
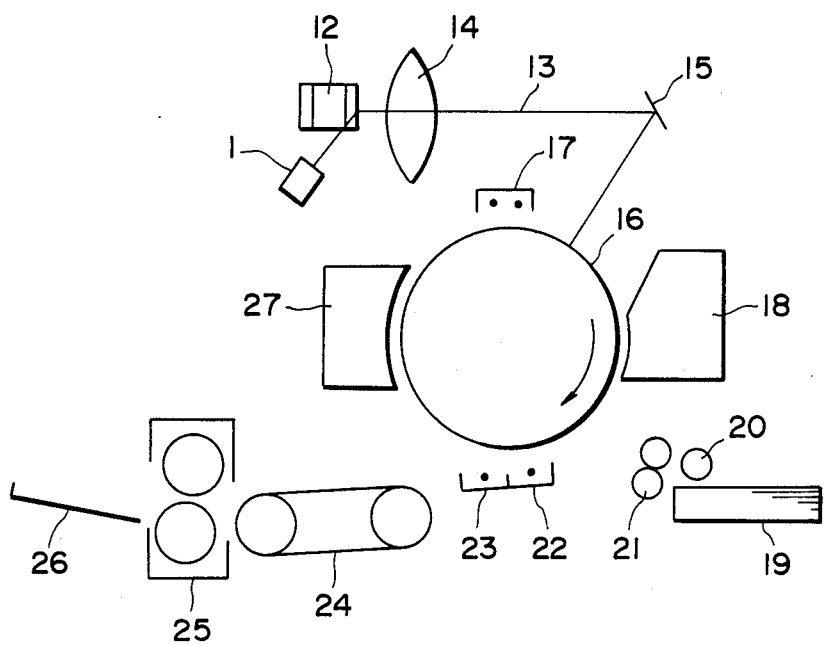
FIG. 8 is a somewhat schematic sectional view of an apparatus according to the embodiment of the present invention.

FIG. 8 is a somewhat schematic view of a laser beam printer using the semiconductor laser described above. The apparatus comprises a laser unit 1 having the structure described in conjunction with FIG. 4, which is controlled in accordance with the information signal to be recorded transmitted thereto from an image reading device or a computer. The laser beam 13 emitted therefrom is the one modulated in accordance with the information signal to be recorded, and is deflected by a polygonal mirror 12. The laser beam 13 is passed through an imaging lens 14 having so-called f-θ characteristics and is imaged on an electrophotographic photosensitive member 16 which rotates in the direction indicated by an arrow. Before reaching the photosensitive member 16, the beam 13 is folded by a mirror 15. The photosensitive member 16 is uniformly charged by a corona charger 17, and then is exposed and scanned by the deflecting laser beam 13 in the direction substantially parallel to the rotational axis of the photosensitive member 15, so that an electrostatic latent image is formed thereon. The photosensitive member 16 is subjected to a developing operation by the developing device 18, so that the electrostatic latent image is developed. The developing device 18 supplies to the photosensitive member 16 the toner which has been electrically charged to the polarity, the same as that to which the photosensitive member 16 is charged by the corona charger 17. The developing device 18 supplies the toner to the photosensitive member 16 using a known developing roller (not shown) functioning as a developing electrode. Therefore, the toner is deposited onto the photosensitive member in such an area as has been exposed to the laser beam 13 (light potential area), but it is, in effect, not deposited thereon in such an area as has not been exposed to the laser beam 13 (dark potential area). In order to promote the toner to be deposited on the light potential area, the developing electrode is preferably supplied with a bias voltage having a level between the light potential and the black potential.

The toner image thus provided is transferred by a transfer charger 22 onto a transfer sheet supplied from a transfer sheet cassette 19 by a pick-up roller 20 and a register roller couple 21. The transfer sheet is then, separated from the photosensitive member 16 with the aid of a separation charger 23. The transfer sheet is transported by a conveying belt 24 to an image fixing device 25, where the toner image is fixed. Then, the sheet is discharged to a discharge tray 26. On the other hand, after the image transfer, the photosensitive member 16 is cleaned by a cleaner 27 so that the residual toner remaining thereon is removed from the photosensitive member 16 surface, and it is prepared for the next operation.

In the foregoing, the description of the embodiments has been made with respect to a laser beam printer. However, the present invention is applicable to a case where the photosensitive member is exposed to the light produced by an array of light emitting diodes which are selectively driven in accordance with information signal to be recorded. The nature of the relationship between the current and the emitting light in a light emitting diode is substantially the same as shown in FIG. 5, and therefore, the current thereto is controlled in a similar manner as described above so as to utilize the self-heating to control the temperature thereof. Then, the temperature is stabilized particularly at a point of time immediately after the start of the information recording operation. This is effective to remove non-uniform image density on the image.

In the foregoing embodiments, the semiconductor laser is heated by a heater, but it is possible, as the case may be, that a Peltier element or the like may be used to cool the laser to keep it within a predetermined range of temperature.

The photosensitive member is not limited to the electrophotographic photosensitive member as described above, but silver salt film, photomagnetic recording medium, photoresist or the like may be used if it physically or chemically or electrically changes in response to light.

While the invention has been described with reference to the structures disclosed herein, it is not confined to the details set forth and this application is intended to cover such modifications or changes as may come within the purposes of the improvements or the scope of the following claims.

What is claimed is:

1. An information recording apparatus, comprising:
   a semiconductor light source responsive to an information signal to be recorded to produce information light;
   a photosensitive member for receiving the information light produced by said semiconductor light source;
   means for supplying to said semiconductor light source an electric current $I_0$ having a current level lower than a light emitting threshold current $I_{th}$ of said semiconductor light source before said semiconductor light source is driven in accordance with the information signal to be recorded, so that said semi-conductor light source heats itself by the application of the current $I_0$.

2. An apparatus according to claim 1, wherein said semiconductor light source is supplied, in response to an image information signal, selectively with a current $I_1$ having a higher current level than the threshold current $I_{th}$ and with a current $I_0'$ having a lower current level than the threshold current $I_{th}$.

3. An apparatus according to claim 2, wherein the current $I_0$ and the current $I_0'$ have the same level.

4. An apparatus according to claim 1, 2 or 3, further comprising means for externally heating or cooling said semiconductor light source.

5. An apparatus according to claim 1, 2 or 3, wherein said photosensitive member is an electrophotographic photosensitive member, said apparatus further comprising developing means for depositing toner onto said photosensitive member in an area which has been exposed to the information light.

* * * * *

UNITED STATES PATENT AND TRADEMARK OFFICE
CERTIFICATE OF CORRECTION

PATENT NO. : 4,682,876  Page 1 of 2
DATED : July 28, 1987
INVENTOR(S) : YASUMASA OHTSUKA, ET AL.

It is certified that error appears in the above-identified patent and that said Letters Patent is hereby corrected as shown below:

IN THE DRAWINGS

Sheet 3, Fig. 6, "REVEL" should read --LEVEL--.

COLUMN 1

Line 49, "imagewisely" should read --imagewise--.

COLUMN 2

Line 9, "ductor output" should read --ductor laser output--.

COLUMN 3

Line 23, "Ith," should read --Ith is applied,--.
Line 29, "(imagewisely)" should read --(imagewise)--.

COLUMN 4

Line 63, "polarity, the same" should read --same polarity--.

UNITED STATES PATENT AND TRADEMARK OFFICE
CERTIFICATE OF CORRECTION

PATENT NO. : 4,682,876

DATED : July 28, 1987

INVENTOR(S) : YASUMASA OHTSUKA, ET AL.

It is certified that error appears in the above-identified patent and that said Letters Patent is hereby corrected as shown below:

COLUMN 5

Line 12, "then," should read --then--.

COLUMN 6

Line 25, "semi-conductor" should read --semiconductor--.

Signed and Sealed this

Twelfth Day of April, 1988

Attest:

DONALD J. QUIGG

*Attesting Officer*     *Commissioner of Patents and Trademarks*